Sept. 29, 1959 K. G. HUNTLEY ET AL 2,906,870
VALVE CHAIN CIRCUITS
Filed March 23, 1954
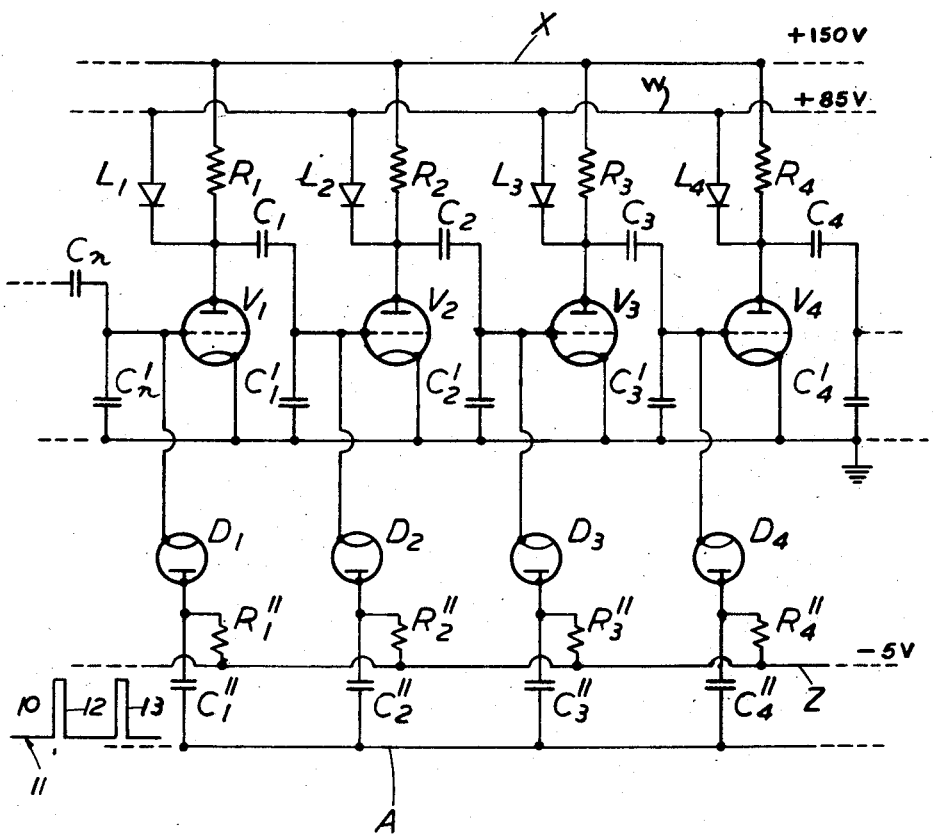
INVENTORS
K. G. Huntley
E. L. C. White
ATTORNEYS

United States Patent Office 2,906,870
Patented Sept. 29, 1959

2,906,870

VALVE CHAIN CIRCUITS

Keith Gordon Huntley, Harlington, Hayes, and Eric Lawrence Casling White, Iver, England, assignors to Electric & Musical Industries Limited, Hayes, England, a British company Application March 23, 1954, Serial No. 418,195

Claims priority, application Great Britain March 27, 1953

1 Claim. (Cl. 250—27)

This invention relates to valve chain circuits, such as employed for example as pulse distributors in multi-way electronic switching circuits or as shifting registers in electronic computing apparatus.

In multi-way electronic switching circuits, and for other purposes, a pulse distributor giving successive pulse outputs each on a separate conductor is required. This can be achieved in practice by means of a so-called ring counter consisting of a ring of identical switchable devices each coupled to its neighbours in the ring and so arranged that one device at a time is in a different condition from all the others, and on the application of a switching pulse simultaneously to all the devices the effect is to transfer the distinctive "condition" to the next device in order round the ring. Thus, the distinctive condition traverses round the ring making a complete circuit after $n$ switching pulses where $n$ denotes the number of switchable devices in the ring. The switchable devices may be, for example, thermionic valve triggers of the kind used in the shifting register described in the specification of United States Patent No. 2,785,304. These triggers each comprise a pair of cross-coupled thermionic valves and with a ring of such triggers any binary pattern can be shifted round the ring, but for some purposes such triggers are uneconomical of components, especially where it is necessary to shift merely a single distinctive condition round the ring.

The object of the present invention is to provide a simple form of valve chain circuit which is suitable for use as a pulse distributor or binary shifting register.

According to the present invention there is provided a valve chain circuit comprising a series of thermionic valves each having an output electrode, a control electrode and a cathode; a source of switching pulses; a series of paths one for each valve succeeding another valve, and comprising a capacitor and a unilaterally conductive device connected from said source to the control electrode of the respective valve with the unilaterally conductive device nearer the control electrode; a leakage resistor for each of said capacitors; the pulses from said source being predetermined to switch said valve from one of two conditions, namely the conducting and non-conducting conditions, to the other of said conditions, circuit connections to said valve electrodes for predetermining the current flow to the output electrode of each valve in the conducting condition thereof, said connections including output impedances one connected to each output electrode whereby a predetermined potential change occurs across an output impedance on switching the respective valve from one condition to the other; means coupling said valves in succession to form a chain, said means comprising a path including a capacitor connected from the output electrode of the first of each two coupled valves to the control electrode of the second of each two coupled valves; and a further capacitor connected from the respective control electrode to a point of substantially fixed potential; the circuit connections including said capacitors being proportioned to cause a potential change produced across one of said output impedances when the respective valve is switched from said one condition to said other condition in response to a switching pulse to produce a reverse change in the succeeding valve even in the presence of the switching pulse.

In order that the invention may be clearly understood and readily carried into effect, the invention will be described with reference to the accompanying drawing, which illustrates one application of a ring counter which embodies the present invention and in which switching pulses are applied simultaneously to all the valves in the ring.

Referring to the drawing, the counter comprises a series of thermionic vacuum valves V1, V2 . . . V$n$, each a triode valve and each with identical circuit connections and coupled to its neighbours so as to form a ring chain. Since the valve stages are identical only the stages containing the valves V1 to V4 are shown, the corresponding components in the different stages being distinguished by the suffixes 1, 2, 3 and 4, and the description will therefore be confined to the stages shown. The valves V1, V2, V3 and V4 have their anodes connected to the positive H.T. bus-bar X by resistors R1, R2, R3 and R4. A capacity potential divider comprising capacitors C1 and C'1 is conected from the anode of the valve V1 to ground and the control electrode of the valve V2 is connected to the junction of capacitors C1 and C'1. The anodes of the valves V2, V3 and V4 are similarly coupled to the control electrodes of the succeeding valves by capacitors C2 and C'2, C3 and C'3, and C4 and C'4. Moreover, the control electrodes of the valves V1, V2, V3 and V4 are coupled to a switching pulse bus-bar A via diode valves D1, D2, D3 and D4 and capacitors C"1, C"2, C"3 and C"4, the cathodes of the diodes being nearer the control electrodes. Resistors R"1, R"2, R"3 and R"4 connect the upper electrodes of the capacitors C"1, C"2, C"3 and C"4 to the negative bias voltage bus-bar Z. Thermionic diodes or other rectifiers L1, L2, L3 and L4 acting as limiters connect the anodes of the valves V1, V2, V3 and V4 to a bus-bar W which is maintained at a fixed potential and determines the lower limit of the potential for the anodes of the valves.

In operation of the circuit described positive switching pulses as indicated by the waveform 10 are applied continuously to the switching pulse bus-bar A and in the absence of the pulses the anodes of the diodes D1 are maintained at the negative H.T. potential on the bus-bar Z by virtue of the resistors R"1, R"2, R"3 and R"4. The circuit is so arranged that in operation all the valves V1 to V$n$, except one, are in the conducting condition and the nonconducting condition is transferred from one valve to the next in order round the ring in response to the positive pulses in the waveform 10. It will be assumed that at a time corresponding to the point 11 in the waveform 10 the valve V2 is non-conducting and all the other valves V1, V3 etc. are conducting, the potential at the junction of C1 and C'1 being sufficiently negative to cut off the valve V2. The left-hand electrode of the capacitor C2 is at or approaching the positive H.T. potential on the bus-bar X and the right-hand electrode is at ground potential, this latter potential being fixed by the tendency of the control electrode of V3 to draw current. The next positive pulse 12 in the waveform 10 causes the diode D2 to conduct and charges capacitors C1 and C'1, via the diode D2 and the capacitor C"2, to a sufficient level to switch on the valve V2. When the valve V2 is switched on its anode potential drops to the limit set by conduction of the limiter L2 and the fraction of this potential excursion which appears at the junction of C2 and C'2 is sufficient to cut off the valve V3 in spite of the positive shift pulse simultaneously fed to the control electrode of the valve V3 via the diode D3 and capacitor C"3. This is achieved by correct proportioning of the capacitors C2 and C"3 in relation to the potential swing at the anode of the valve V2 and the shift pulse amplitude, bearing in mind that the shift pulse amplitude as applied to the control electrode of the valve V3 is reduced by the dividing action of the capacitors C"3 and C'2. When the switching pulse 12 ceases a sufficient negative potential is left at the junction of C2 and C'2 to maintain the valve V3 non-conducting during the interval to the next switching pulse L3. The capacitor C"3 discharges through R"3 sufficiently during said interval to allow the next switching pulse 13 to render the diode D3 conducting and switch the valve V3 on once more, since this time there is no negative pulse from the anode of V2. In a practical application of the circuit illustrated the capacitors C1, C2 . . . may be equal to the capacitors C"1, C"2 . . . and the capacitors C'1, C'2 may have twice the capacity. The potentials on the busbars W, X, Z, may be +85, +150 and −5 volts respectively, relative to the cathodes of the valves V1, V2, V3 . . . . The amplitude of the switching pulses may be 40 volts. Positive output pulses can be derived in succession from the anodes of the valves V1, V2, V3 . . . . The upper limit to the permissible interval between successive switching pulses is set by the values of the capacitances of C1, C2, etc. and C'1, C'2, etc. and the stray leakage existing at the grids of the valves.

The circuit illustrated in Figure 1 hereof can be modified for operation with all the valves except one non-conducting, in which case the conducting condition would be propagated round the ring.

While the invention has been described with reference to ring chain circuits which can be employed as pulse distributors, the invention may also be applied to open chain circuits, in which case it is necessary to feed in a suitable input pulse at intervals of $n$ shift pulses apart, assuming $n$ stages. Such an open chain circuit can also be employed as a binary shifting register. In such an application, the chain may be required to shift any arbitrary binary pattern, that is it may be necessary to shift more than one "pulse" at a time, but this can be achieved with the circuits described provided there is always at least one gap between any pair of such "pulses." Each unit of the register would then consist of two valves and the transfer of a binary state from one unit to the next would require the application of two switching pulses.

What we claim is:

A valve chain circuit comprising a series of thermionic valves each having an output electrode, a control electrode and a cathode; a source of switching pulses; a series of paths one for each valve succeeding another valve, and comprising a capacitor and a unilaterally conductive device connected from said source to the control electrode of the respective valve with the unilaterally conductive device nearer the control electrode; a leakage resistor for each of said capacitors; the pulses from said source being predetermined to switch said valve from one of two conditions, namely the conducting and non-conducting conditions, to the other of said conditions; circuit connections to said valve electrodes for predetermining the current flow to the output electrode of each valve in the conducting condition thereof, said connections including output impedances one connected to each output electrode whereby a predetermined potential change occurs across an output impedance on switching the respective valve from one condition to the other; means coupling said valves in succession to form a chain, said means comprising a path including a capacitor connected from the output electrode of the first of each two coupled valves to the control electrode of the second of each two coupled valves; and a further capacitor connected from the respective control electrode to a point of substantially fixed potential; the circuit connections including said capacitors being proportioned to cause a potential change produced across one of said output impedances when the respective valve is switched from said one condition to said other condition in response to a switching pulse to produce a reverse change in the succeeding valve even in the presence of the switching pulse.

References Cited in the file of this patent
UNITED STATES PATENTS

| | | |
|---|---|---|
| 2,404,918 | Overbeck | July 30, 1946 |
| 2,503,662 | Flowers | Apr. 11, 1950 |
| 2,536,035 | Cleeton | Jan. 2, 1951 |
| 2,594,336 | Mohr | Apr. 29, 1952 |
| 2,722,630 | Branch | Nov. 1, 1955 |
| 2,758,250 | Ridler | Aug. 7, 1956 |
| 2,802,104 | White | Aug. 6, 1957 |